(12) United States Patent
Miyamaki

(10) Patent No.: US 9,955,058 B2
(45) Date of Patent: *Apr. 24, 2018

(54) MULTI-CODEC CAMERA SYSTEM AND IMAGE ACQUISITION PROGRAM

(75) Inventor: Hideo Miyamaki, Tokyo (JP)

(73) Assignee: SONY CORPORATION, Tokyo (JP)

(*) Notice: Subject to any disclaimer, the term of this patent is extended or adjusted under 35 U.S.C. 154(b) by 1004 days.

This patent is subject to a terminal disclaimer.

(21) Appl. No.: 13/404,450

(22) Filed: Feb. 24, 2012

(65) Prior Publication Data

US 2012/0154623 A1     Jun. 21, 2012

Related U.S. Application Data

(63) Continuation of application No. 11/563,067, filed on Nov. 24, 2006, now Pat. No. 8,139,633.

(30) Foreign Application Priority Data

Dec. 2, 2005 (JP) ................. 2005-348641

(51) Int. Cl.
| H04N 7/12 | (2006.01) |
| H04N 5/232 | (2006.01) |
| G08B 13/196 | (2006.01) |
| H04N 7/18 | (2006.01) |
| H04N 21/2343 | (2011.01) |
| H04N 21/238 | (2011.01) |

(Continued)

(52) U.S. Cl.
CPC .......... *H04N 5/232* (2013.01); *G08B 13/1968* (2013.01); *G08B 13/19656* (2013.01); *G08B 13/19667* (2013.01); *H04N 5/23206* (2013.01); *H04N 7/181* (2013.01); *H04N 7/185* (2013.01); *H04N 21/238* (2013.01); *H04N 21/23439* (2013.01); *H04N 21/2405* (2013.01); *H04N 21/2662* (2013.01)

(58) Field of Classification Search
CPC .... H04N 1/00129; H04N 19/61; H04N 19/91; H04N 19/13; H04N 19/42; H04N 19/423; H04N 19/46; H04N 19/115; H04N 19/63; H04N 19/17; H04N 19/172; H04N 19/124; H04N 19/162; G08B 13/19673
USPC ....... 348/14.01, 220.1, 220; 370/468; 726/3; 382/235; 375/240.01
See application file for complete search history.

(56) References Cited

U.S. PATENT DOCUMENTS 5,748,233 A * 5/1998 Kitajima et al. ........... 348/220.1
6,111,605 A * 8/2000 Suzuki ............... H04N 1/00129
                                                    348/220.1

(Continued)

FOREIGN PATENT DOCUMENTS

JP   2000-115762   4/2000
JP   2000-333159   11/2000

*Primary Examiner* — Gims Philippe
(74) *Attorney, Agent, or Firm* — Oblon, McClelland, Maier & Neustadt, L.L.P.

(57) ABSTRACT

A multi-codec camera system includes a multi-codec camera that acquires video in the form of multiple compression-rate image data and a determination module that selects image data from the multiple compression-rate image data acquired by the multi-codec camera according to a predetermined reference, wherein when a predetermined object is detected from the video acquired by the multi-codec camera, the determination module selects image data at a compression rate according to the size of the detected object.

16 Claims, 4 Drawing Sheets

(51) Int. Cl.
*H04N 21/24* (2011.01)
*H04N 21/2662* (2011.01)

(56) References Cited

U.S. PATENT DOCUMENTS

| | | | |
|---|---|---|---|
| 6,314,206 B1* | 11/2001 | Sato | 382/235 |
| 6,954,859 B1* | 10/2005 | Simerly et al. | 726/3 |
| 7,002,992 B1* | 2/2006 | Shaffer et al. | 370/468 |
| 7,075,986 B2* | 7/2006 | Girod | H04N 9/8042 375/240.12 |
| 7,184,077 B2* | 2/2007 | Kitajima | 348/220.1 |
| 7,599,434 B2* | 10/2009 | Reynolds et al. | 375/240.01 |
| 2003/0214573 A1* | 11/2003 | Oh | 348/14.01 |
| 2005/0110634 A1* | 5/2005 | Salcedo | G08B 13/19673 340/539.1 |
| 2008/0305829 A1* | 12/2008 | Monroe | 455/556.1 |

* cited by examiner

FIG. 4

| General | Camera | Picture | Motion Detection | Dynamic Masking | Tours | Sharing |

Video Codec: JPEG-MPEG4 ▼    ☑ Stream Mode
Streaming: MPEG4 ▼

┌─ JPEG (Priority: High) ─┐  ┌─ MPEG4 (Priority: Low) ─┐
Interval: 0 ms              0 ms
         (Max Speed)        (Max Speed)
Resolution: 320×240 ▼       320×240 ▼
Image Quality: 50 %         50 %

Colour Level: 50 %

---

| General | Camera | Picture | Motion Detection | Dynamic Masking | Tours | Sharing |

Video Codec: MPEG4-JPEG ▼    ☑ Stream Mode
Streaming: JPEG ▼

┌─ MPEG4 (Priority: High) ─┐  ┌─ JPEG (Priority: Low) ─┐
Interval: 0 ms              0 ms
         (Max Speed)        (Max Speed)
Resolution: 320×240 ▼       320×240 ▼
Image Quality: 50 %         50 %

Colour Level: 50 %

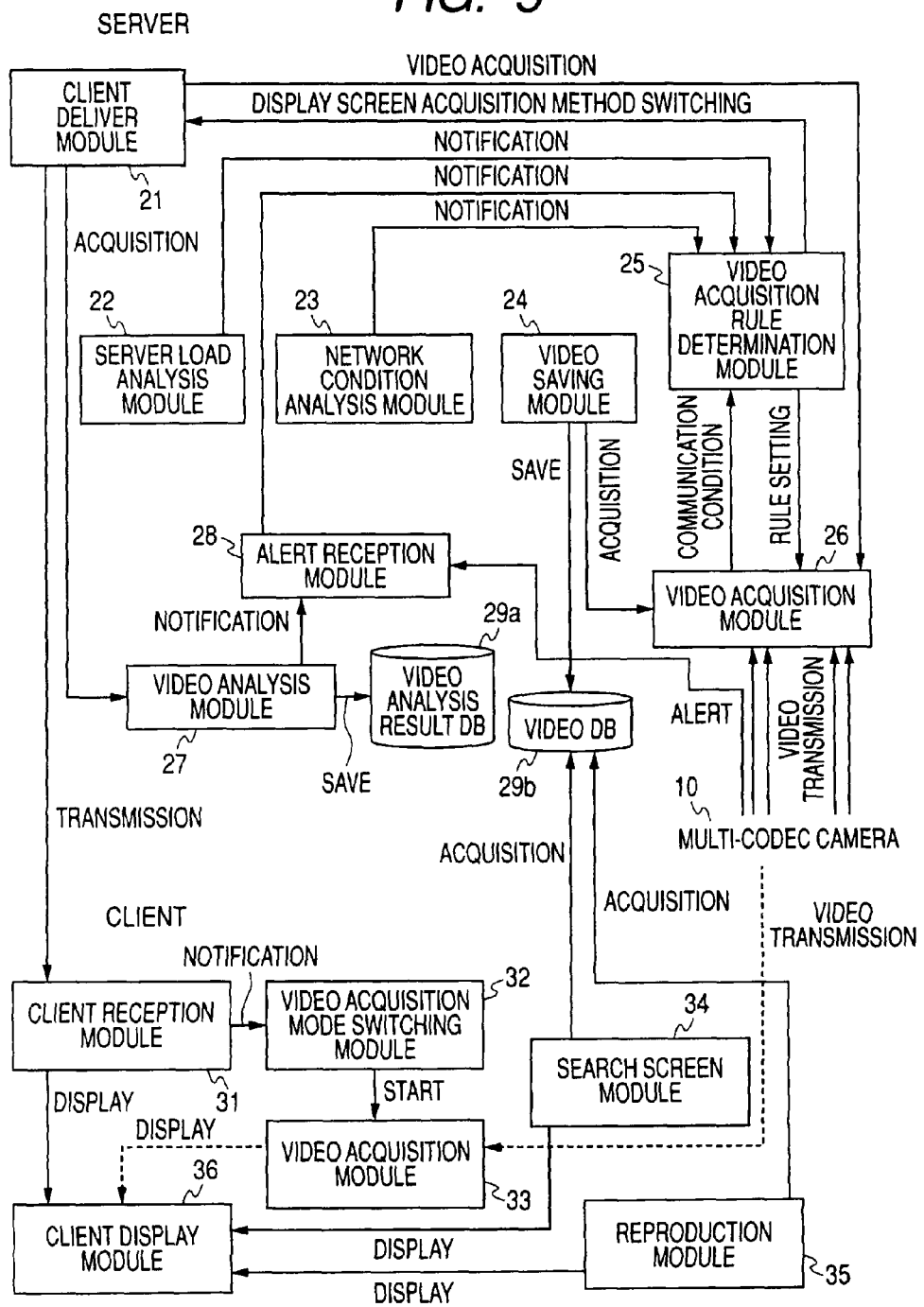

MULTI-CODEC CAMERA SYSTEM AND IMAGE ACQUISITION PROGRAM

CROSS REFERENCES TO RELATED APPLICATIONS

This application is a continuation of and is based upon and claims the benefit of priority under 35 U.S.C. § 120 for U.S. Ser. No. 11/563,067, filed Nov. 24, 2006, and claims the benefit of priority under 35 U.S.C. § 119 from European Patent Application No. 06 291044.3, filed Jun. 23, 2006, the entire contents of which are incorporated herein by reference.

BACKGROUND OF THE INVENTION

1. Field of the Invention

The invention relates to a multi-codec camera system and an image acquisition program that use a multi-codec camera that acquires video in the form of multiple compression-rate image data so as to provide optimal image data according to various conditions to a client.

2. Description of the Related Art

In a network camera system that acquires video via a network in related art, a camera connected to the network selects the codec of acquired image data (for example, MPEG: Moving Picture Experts Group or JPEG: Joint Photographic Experts Group) and the selected codec image data is transferred to a server or a client (see JP-A-2003-204518, JP-A-2004-146959 and JP-A-2005-136613, for example).

On the other hand, in recent years, a multi-codec camera that supports multiple types of codec is available. By using such a camera, it is possible to build a system that handles multiple codec image data.

SUMMARY OF THE INVENTION

However, in a system using a multi-codec camera, although same video images can be simultaneously acquired using multiple types of codec, no system can effectively use these images. That is, no system can handle image data optimal to delivery according to various conditions, such as the acquired video and the network load, so that no system sufficiently takes advantage of the convenience of video acquisition by a multi-codec camera.

According to an embodiment of the invention, there is provided a multi-codec camera system including a multi-codec camera that acquires video in the form of multiple compression-rate image data and a determination module that selects image data from the multiple compression-rate image data acquired by the multi-codec camera according to a predetermined reference. When a predetermined object is detected from the video acquired by the multi-codec camera, the determination module selects image data at a compression rate according to the size of the detected object.

According to the embodiment of the invention, since a predetermined object is detected from the video acquired by the multi-codec camera and image data at a compression rate according to the size of the detected object is selected, image data at an optimal compression rate for the size of the detected object can be transferred to a server and a client.

When the detected object is larger than a predetermined size, image data at a first compression rate (MPEG, for example) is selected, while when the detected object is smaller than the predetermined size, image data at a second compression rate (JPEG, for example), which is lower than the first compression rate, is selected. That is, a lower compression rate is selected for smaller detected object that demands higher quality, while a higher compression rate is selected for larger detected object that does not demand high quality, so as to give a high priority to the transfer speed.

According to another embodiment of the invention, there is provided a multi-codec camera system including a multi-codec camera that acquires video in the form of multiple compression-rate image data, and a server that is connected to the multi-codec camera via a network and has a determination module that selects image data from the multiple compression-rate image data acquired by the multi-codec camera according to a predetermined reference. The determination module of the server selects image data at a compression rate according to the condition of the network load from the multiple compression-rate image data acquired by the multi-codec camera.

According to the embodiment of the invention, since image data at an optimal compression rate is selected for the condition of the network load, image data at a compression rate optimal to the successively varying conditions of the network load can be transferred to a server and a client.

When the condition of the network load is higher than a predetermined reference value, the determination module selects image data at a first compression rate (MPEG, for example), while when the condition of the network load is lower than the predetermined reference value, the determination module selects image data at a second compression rate (JPEG, for example) that is lower than the first compression rate. That is, image data at a higher compression rate is used for a higher network load, allowing a reduced network load.

According to another embodiment of the invention, there is provided a multi-codec camera system including a multi-codec camera that acquires video in the form of multiple compression-rate image data, a server that is connected to the multi-codec camera via a network and has a determination module that selects image data from the multiple compression-rate image data acquired by the multi-codec camera according to a predetermined reference, and a client connected to the network. The server saves the multiple compression-rate image data acquired by the multi-codec camera, and the client uses image data at a first compression rate when the client searches the image data saved in the server for image data that the client wants to acquire, while the client acquires image data at a second compression rate that is higher than the first compression rate, when the client acquires the searched image data from the server.

According to the embodiment of the invention, since multiple compression-rate image data are simultaneously saved in the server, when the client searches image data saved in the server, the client can quickly perform the searching, for example, by using image data at the lower compression rate captured as still images, while when the client acquires the searched image data from the server, the client can efficiently transfer image data at the higher compression rate captured as video images.

According to another embodiment of the invention, there is provided an image acquisition program executed on a multi-codec camera system including a multi-codec camera that acquires video in the form of multiple compression-rate image data and a determination module that selects image data from the multiple compression-rate image data acquired by the multi-codec camera according to a predetermined reference. As program processes in the determination module, the image acquisition program includes the steps of detecting a predetermined object from the video acquired by the multi-codec camera and selecting image data at a compression rate according to the size of the detected object.

According to the embodiment of the invention, since a predetermined object is detected from the video acquired by the multi-codec camera and image data at a compression rate according to the size of the detected object is selected, image data at an optimal compression rate for the size of the detected object can be transferred to a server and a client.

According to another embodiment of the invention, there is provided an image acquisition program executed on a multi-codec camera system including a multi-codec camera that acquires video in the form of multiple compression-rate image data, and a server that is connected to the multi-codec camera via a network and has a determination module that selects image data from the multiple compression-rate image data acquired by the multi-codec camera according to a predetermined reference. As a program process in the determination module of the server, the image acquisition program includes the step of selecting image data at a compression rate according to the condition of the network load from the multiple compression-rate image data acquired by the multi-codec camera.

According to the embodiment of the invention, since image data at an optimal compression rate is selected for the condition of the network load, image data at a compression rate optimal to the successively varying conditions of the network load can be transferred to a server and a client.

According to another embodiment of the invention, there is provided an image acquisition program executed on a multi-codec camera system including a multi-codec camera that acquires video in the form of multiple compression-rate image data, a server that is connected to the multi-codec camera via a network and has a determination module that selects image data from the multiple compression-rate image data acquired by the multi-codec camera according to a predetermined reference, and a client connected to the network. The image acquisition program includes the steps of, as a program process in the server, saving the multiple compression-rate image data acquired by the multi-codec camera, and, as a program process in the client, using image data at a first compression rate when the client searches the image data saved in the server for image data that the client wants to acquire, while acquiring image data at a second compression rate that is lower than the first compression rate, when the client acquires the searched image data from the server.

According to the embodiment of the invention, since multiple compression-rate image data are simultaneously saved in the server, when the client searches image data saved in the server, the client can quickly perform the searching, for example, by using image data at the lower compression rate captured as still images, while when the client acquires the searched image data from the server, the client can efficiently transfer image data at the higher compression rate captured as video images.

Therefore, the invention provides the following advantage. That is, in the system using the multi-codec camera, the system selects an optimal codec according to the condition, so that optimal image data in accordance with the network load and requests from the user can be quickly provided.

BRIEF DESCRIPTION OF THE DRAWINGS

FIG. 4 shows an exemplary GUI; and

FIG. 5 is a software module correlation diagram showing the relationship among the modules.

DESCRIPTION OF THE PREFERRED EMBODIMENTS

Embodiments of the invention will be described below with reference to the drawings.

Base Environment for this Embodiment

Figure 1:
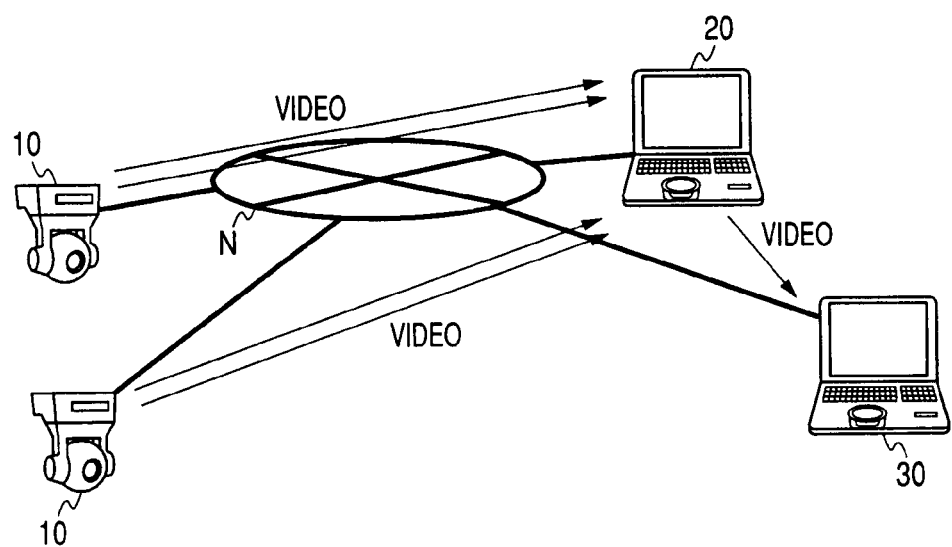
FIG. 1 is a first schematic configuration diagram of the multi-codec camera system according to this embodiment.
Figure 2:
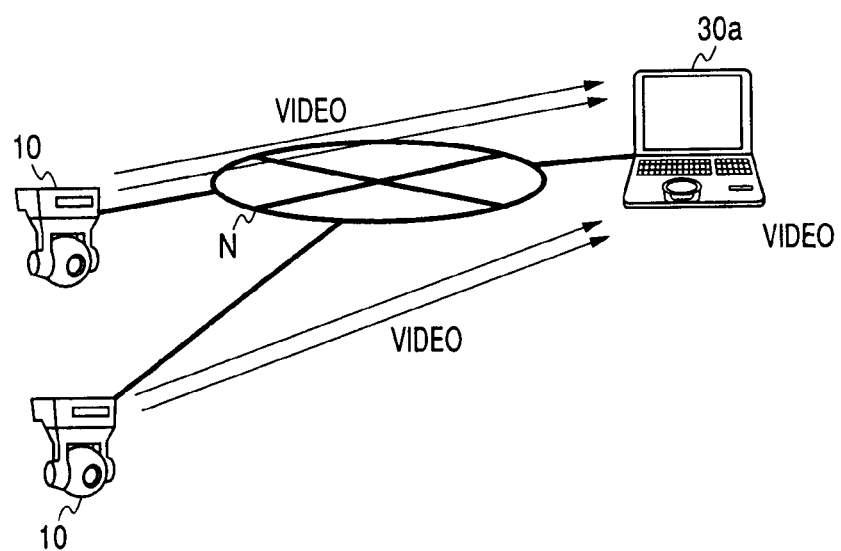
FIG. 2 is a second schematic configuration diagram of the multi-codec camera system according to this embodiment.

FIG. 1 is a first schematic configuration diagram of the multi-codec camera system according to this embodiment, and FIG. 2 is a second schematic configuration diagram of the multi-codec camera system according to this embodiment. That is, as shown in FIG. 1, a base environment for this embodiment is a system capable of managing one or more multi-codec cameras 10, which includes a multi-codec camera 10, a server 20 that acquires, analyzes and saves video from the multi-codec camera 10, a client 30 that remotely controls the server 20 and views the video, and a network N that connects the above components. The client 30 and the server 20 are equipped with functions for acquiring video from the multi-codec camera 10, switching the type of codec of the captured image or remotely controlling simultaneous acquisition via the network.

The multi-codec camera 10 herein is an image input apparatus capable of capturing image data processed at multiple types of compression rates. This embodiment employs an image input apparatus capable of capturing, for example, both high compression-rate MPEG-4 (Moving Picture Experts Group phase 4) image data and low compression-rate JPEG image data.

The client 30 is equipped with a function that changes the setting of the server 20, a function that acquires video accumulated in the server 20 and a video analysis result, and a function that switches to a mode in which video is directly acquired from the multi-codec camera 10.

As shown FIG. 2, this embodiment can also be applied to a system including a management client 30a having both a server function and a client function, and a plurality of multi-codec cameras 10. This embodiment can also be applied to a system in which each multi-codec camera 10 has a determination module that normally belongs to a server and operates without involving any network.

System Necessary for this Embodiment

Figure 3:
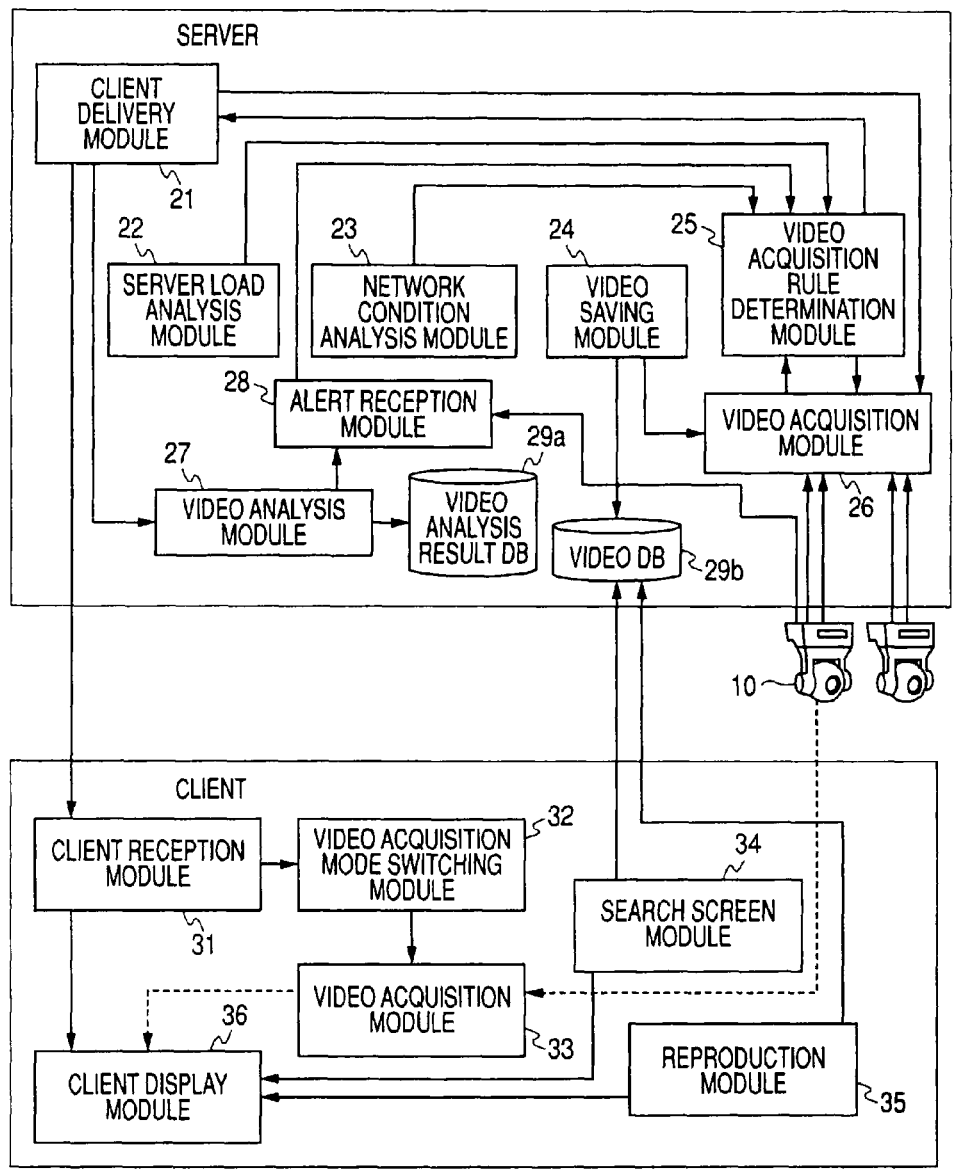
FIG. 3 is a configuration diagram showing modules necessary for the multi-codec camera system according to this embodiment.

FIG. 3 is a configuration diagram showing modules necessary for the multi-codec camera system according to this embodiment. That is, the server 20 is equipped with a "client delivery module 21" that delivers video and video analysis results as well as video that the server 20 has to the client 30, a "server load analysis module 22" that checks the current load on the server 20, a "network condition analysis module 23" that checks the current condition of the network, a "video saving module 24" that saves video acquired from the multi-codec cameras 10 based on a preset rule, a "video acquisition rule determination module 25" that determines a video acquisition rule from the condition of the server 20, the condition of the network and the type of an alert, a "video acquisition module 26" that can simultaneously acquire multiple-codec video from the multi-codec camera 10, a "video analysis module 27" that can detect an object in motion and an object not in motion from the video, an "alert reception module 28" that can receive an alert from the multi-codec camera 10 or the "video analysis module 27", a "video analysis result DB (database) 29a" that saves video analysis results, and a "video DB 29b" that saves video.

The client 30 is equipped with a "client reception module 31" that can receive video and video analysis results from the server 20 as well as the condition of the server 20, a "video acquisition mode switching module 32" that determines how to acquire video based on the received result, a "video acquisition module 33" that can acquire video from the multi-codec camera 10, a "search screen module 34" that displays a search screen, a "reproduction module 35" that reproduces accumulated images in the server 20 and a "client display module 36" that allows the client 30 to display imaging results.

The priority in the multi-codec setting can be manually set and FIG. 4 shows an exemplary GUI (Graphical User Interface) for performing the setting. In this exemplary GUI, from the top to bottom, it is possible to set which codec (for example, MPEG4 or JPEG) is given priority and which codec is used to save video, and set the frame rate, resolution, compression level and color level of the respective types of codec. In this embodiment, these parameters are automatically set according to the condition.

The above modules are implemented as program processes executed on the server 20 and the client 30, each of which includes a computer. Specific examples and roles of the modules applied in this embodiment will be described below.

[Video Acquisition Module]
The video acquisition module acquires video from the multi-codec camera 10.

[Client Delivery Module]
The client delivery module delivers video and video analysis results, the condition of the server 20, and instructions to the client 30.

[Server Load Analysis Module]
The server load analysis module analyzes the conditions of the CPU (Central Processing Unit) and disk access of the server 20.

[Network Condition Analysis Module]
The network condition analysis module analyzes the condition of the network load based on, for example, the planned frame rate at which information will be received from the multi-codec camera 10 and the actually receivable frame rate, as well as the response time (Ping) of communication with the multi-codec camera 10 and the client 30.

[Video Analysis Module]
The video analysis module detects an object in motion or an object not in motion from video and analyzes, for example, the size of the detected object.

[Video Saving Module]
The video saving module saves video from each of the multi-codec cameras 10 in the database using a pre-specified codec.

[Alert Reception Module]
The alert reception module receives an alert from the multi-codec camera 10 or the video analysis module to notify the contents of the alert to the "video acquisition rule determination module."

[Video Acquisition Rule Determination Module]
The video acquisition rule determination module determines what codec should currently be used to acquire video from the multi-codec camera 10 and what codec should be used to deliver the video to the client 3 based on the load on the server 20, the communication condition of the network and the alert information.

[Video Analysis Result DB]
The video analysis result DB is a database that saves video analysis results. The data saved in the video analysis result DB is retrieved when the client 30 reproduces the saved video.

[Video DB]
The video DB is a database that saves video. The data saved in the video DB is retrieved when the client 30 reproduces the saved video.

[Client Reception Module]
The client reception module receives video, video analysis results, instructions from the server 20 and the condition of the server 20.

[Video Acquisition Mode Switching Module]
The video acquisition mode switching module switches the video acquisition mode of the client 30 to directly acquire video for display from the multi-codec camera 10 depending on the instruction from the server 20.

[Search Screen Module]
The search screen module acquires information necessary for displaying a search screen on the client 30 from the server 20.

[Reproduction Module]
The reproduction module acquires information necessary for displaying video accumulated in the server 20 on the client 30 from the server 20.

[Client Display Module]
The client display module displays video or video analysis results acquired from the server 20 or the multi-codec camera 10.

FIG. 5 is a software module correlation diagram showing the relationship among the modules. The operation of the system will be described with reference to the correlation diagram.

<Description of the Operation>
(1) The operation of switching the types of codec when an object in motion with a certain size (preset reference size) or greater (a closer object in motion) is detected, when an object in motion with a certain size or smaller (a farther object in motion) is detected, or when alert information is received from the camera. The flow of the operation will be described in (1-1) to (1-6) below.

(1-1) The "video acquisition module 26" acquires video in a pre-specified high-priority codec or in multiple types of codec from the multi-codec camera.

(1-2) The "video analysis module 27" detects an object in motion or an object not in motion based on the video.

(1-3) The "video analysis module 27" notifies the size of the object in motion or the size of the object not in motion to the "alert reception module 28." When an alert is received from the multi-codec camera 10, the "alert reception module 28" acquires the contents of the alert (such as detection of an object in motion, detection of an object not in motion and detection of sound).

(1-4) The "alert reception module 28" notifies the contents of the alert to the "video acquisition rule determination module 25."

(1-5) The "video acquisition rule determination module 25" sends an instruction to change how to acquire video to the "video acquisition module 26" according to the contents of the notification.

When an object in motion with a size greater than a certain value (or an object not in motion) is detected, or when sound detection is received from the multi-codec camera 10, the image acquisition method is switched to the codec by which MPEG video is delivered to the client, while when an object in motion (or an object not in motion) with a size smaller than a certain value is detected, the image acquisition method is switched to the codec by which JPEG video is delivered to the client. The image acquisition method can also be switched to the codec by which the video is saved in the [video DB 29b] of the server. These settings can also be registered in advance.

(1-6) The "video acquisition module 26" changes the codec of the video acquired from the multi-codec camera 10 as necessary.

(2) The operation of switching the types of codec when the condition of the network load or the condition of the server load becomes worse. The flow of the operation will be described in (2-1) to (2-7) below.

(2-1) The "video acquisition module 26" acquires video in a pre-specified high-priority codec or in multiple types of codec from the multi-codec camera.

(2-2) The "network condition analysis module 23" determines the condition of the network load based on the frame rate setting, the currently receivable frame rate and the result of a network load check command. When the network load exceeds a predetermined threshold value, the condition of the network is notified to the "video acquisition rule determination module 25."

(2-3) The "video acquisition rule determination module 25" sends an instruction to change how to acquire video to the "video acquisition module 26" according to the contents of the notification from the "network condition analysis module 23."

When there is no (or very small) communication load on the network, the image acquisition method is switched to receive both JPEG and MPEG video, while when the communication load on the network is lower than a certain threshold value and an alert notification currently does not require audio, the image acquisition method is switched to receive JPEG video (MPEG video when audio is required). When the frame rate of JPEG image acquisition is lower than the set value or when the communication load on the network is higher than the certain threshold value, the image acquisition method is switched to receive MPEG video. When the communication load is even higher and exceeds another certain threshold value, the image acquisition method is switched to receive H264 codec video from the multi-codec camera 10. These settings can also be registered in advance.

(2-4) When the "server load analysis module 22" has determined that the server load is high, the "server load analysis module 22" sends a codec acquisition instruction for display to the client via the "client delivery module 21."

(2-5) When the "client reception module 31" of the client receives the codec acquisition instruction sent from the "client delivery module 21" of the server, the "client reception module 31" notifies it to the "video acquisition mode switching module 32", and the "video acquisition module 33" contained in the client starts acquiring display video directly from the multi-codec camera 10 (see the broken-line arrow in FIG. 5).

(2-6) The "client display module 36" merges the video with the video analysis result acquired from the "client reception module 31" and displays the video to the user.

(2-7) When the network load decreases, the "network condition analysis module 23" notifies the improved network condition to the "video acquisition rule determination module 25" and the "video acquisition rule determination module 25" switches the video acquisition method again.

(3) The operation when the server saves JPEG images for searching purposes and the client uses the JPEG images for searching. The flow of the operation will be described in (3-1) to (3-4) below.

(3-1) The "video acquisition module 26" acquires both MPEG and JPEG codec video from the multi-codec camera 10.

(3-2) The "video saving module 24" saves JPEG images regularly or whenever an object in motion is detected as thumbnail images used when the client performs searching. On the other hand, MPEG video may be always recorded.

(3-3) When the client sends a request for displaying the search screen, the "search screen module 34" acquires the thumbnail images from the server and the "client display module 36" displays the search screen.

(3-4) When the client selects a thumbnail image, the "reproduction module 35" acquires MPEG video from the server based on the imaging time recorded together with the thumbnail image and the "client display module 36" starts reproducing the MPEG video.

According to the embodiment described above, detection of an object in motion in the video, for example, detection of an object in motion within a predetermined distance from the camera or detection of sound can trigger alarm notification to automatically switch to the MPEG codec for transmission of audio and images. When the object in motion is outside the predetermined distance, the codec is switched to JPEG for higher resolution, which does not allow acquiring sound but correspondingly allows transmitting sharper video for each frame than in the MPEG codec.

Since both JPEG and MPEG codec video is saved in the server, by considering the network load and the network configuration, when the acquisition frame rate of JPEG images that the server acquires becomes lower than a certain value, higher priority can be given to the MPEG or H264 codec video while reducing the JPEG frame rate, allowing transmitting more seamless video.

In a system that manages a plurality of network cameras, when the server load becomes high and exceeds a certain threshold value, the server can acquire and record only MPEG video and the client can start JPEG video acquisition. In this way, the user can acquire higher quality video according to various conditions than currently achievable in a system acquiring video via a network. Also, by using a lower frame-rate JPEG image as a search key when captured images are reproduced, a search system for accumulated MPEG video can be easily built.

It should be understood by those skilled in the art that various modifications, combinations, sub-combinations and alterations may occur depending on design requirements and other factors insofar as they are within the scope of the appended claims or the equivalents thereof.

What is claimed is:

1. A system comprising:
  circuitry configured to
  receive an alert based on audio detection;
  detect an object in a video;
  set a compression rate of compressed video data corresponding to the video based on the a result of the detection, wherein
    the compression rate is set to a first compression rate in a case that the detected object is within a predetermined distance from a camera by which the video is captured,
    the compression rate is set to the first compression rate in a case that the alert based on the audio detection is received, the compression rate is set to a second compression rate in a case that the detected object is outside of the predetermined distance from the camera, and the first compression rate is different from the second compression rate; and output the compressed video data at the set compression rate.

2. The system of claim 1, wherein the circuitry is configured to set the compression rate based on the result of the object detection and a network load condition.

3. The system of claim 1, wherein the circuitry is configured to output the compressed video data to a client device via a network.

4. The system of claim 1, wherein the circuitry is configured to detect whether the detected object included in the compressed video data is in motion or not in motion.

5. The system of claim 4, wherein the circuitry is configured to set the compression rate to the first compression rate in a case that the detected object is in motion or the detected object is within the predetermined distance from the one or more cameras by which the video is captured.

6. The system of claim 4, wherein the circuitry is configured to set the compression rate to the second compression rate in a case that the detected object is not motion or the detected object is outside of the predetermined distance from the camera.

7. The system of claim 1, wherein the system is a video surveillance system.

8. A method comprising:
receiving an alert based on audio detection;
detecting an object in a video;
setting, by circuitry, a compression rate of compressed video data corresponding to the video based on the a result of the detection, wherein
the compression rate is set to a first compression rate in a case that the detected object is within a predetermined distance from a camera by which the video is captured,
the compression rate is set to the first compression rate in a case that the alert based on the audio detection is received,
the compression rate is set to a second compression rate in a case that the detected object is outside of the predetermined distance from the camera, and
the first compression rate is different from the second compression rate; and
outputting the compressed video data at the set compression rate.

9. The method of claim 8, wherein the compression rate is set based on the result of the object detection and a network load condition.

10. The method of claim 8, wherein the outputting comprises outputting the compressed video data to a client device via a network.

11. A system comprising:
means for receiving an alert based on audio detection;
means for detecting an object in a video;
means for setting a compression rate of compressed video data corresponding to the video based on the a result of the detection, wherein
the compression rate is set to a first compression rate in a case that the detected object is within a predetermined distance from a camera by which the video is captured,
the compression rate is set to the first compression rate in a case that the alert based on the audio detection is received,
the compression rate is set to a second compression rate in a case that the detected object is outside of the predetermined distance from the camera, and
the first compression rate is different from the second compression rate; and
means for outputting the compressed video data at the set compression rate.

12. The system of claim 11, wherein
the compression rate is set based on the result of the object detection and a network load condition.

13. The system of claim 11, wherein the means for outputting outputs the compressed video data to a client device via a network.

14. A system comprising:
one or more cameras configured to capture a video; and
circuitry configured to
receive an alert based on audio detection;
detect an object in the video;
set a compression rate of compressed video data corresponding to the video based on the a result of the detection, wherein
the compression rate is set to a first compression rate in a case that the detected object is within a predetermined distance from the one or more cameras by which the video is captured,
the compression rate is set to the first compression rate in a case that the alert based on the audio detection is received,
the compression rate is set to a second compression rate in a case that the detected object is outside of the predetermined distance from the one or more cameras, and
the first compression rate is different from the second compression rate; and
output the compressed video data at the set compression rate.

15. A method comprising:
capturing a video by one or more cameras;
receiving an alert based on audio detection;
detecting an object in the video;
setting, by circuitry, a compression rate of compressed video data corresponding to the video based on the a result of the detection, wherein
the compression rate is set to a first compression rate in a case that the detected object is within a predetermined distance from the one or more cameras by which the video is captured,
the compression rate is set to the first compression rate in a case that the alert based on the audio detection is received,
the compression rate is set to a second compression rate in a case that the detected object is outside of the predetermined distance from the one or more cameras, and
the first compression rate is different from the second compression rate; and
outputting the compressed video data at the set compression rate.

16. A system comprising:
one or more cameras configured to capture a video; and
means for receiving an alert based on audio detection;
means for detecting an object in the video;
means for setting a compression rate of compressed video data corresponding to the video based on the a result of the detection, wherein
the compression rate is set to a first compression rate in a case that the detected object is within a predetermined distance from the one or more cameras by which the video is captured, the compression rate is set to the first compression rate in a case that the alert based on the audio detection is received, the compression rate is set to a second compression rate in a case that the detected object is outside of the predetermined distance from the one or more cameras, and the first compression rate is different from the second compression rate; and means for outputting the compressed video data at the set compression rate.

\* \* \* \* \*